(12) United States Patent
Foster

(10) Patent No.: US 6,434,980 B1
(45) Date of Patent: Aug. 20, 2002

(54) TIRE CLAMP FOR IMMOBILIZING A VEHICLE

(76) Inventor: Robert Foster, P.O. Box 1368, Sharon Hill, PA (US) 19079

( * ) Notice: Subject to any disclaimer, the term of this patent is extended or adjusted under 35 U.S.C. 154(b) by 0 days.

(21) Appl. No.: 09/933,390

(22) Filed: Aug. 20, 2001

(51) Int. Cl.[7] .......................... E05B 73/00; B60R 25/00
(52) U.S. Cl. .................. 70/19; 70/14; 70/21; 70/237; 70/258; 70/259; 70/260
(58) Field of Search .......................... 70/19, 14, 260, 70/259, 258, 237, 21, 226, 225

(56) References Cited

U.S. PATENT DOCUMENTS

| | | | | |
|---|---|---|---|---|
| 963,808 | A | * 7/1910 | Rigny | 224/42.26 |
| 1,072,559 | A | * 9/1913 | Bacon | 70/19 |
| 1,149,606 | A | * 8/1915 | Violi | 224/42.3 |
| 4,833,442 | A | * 5/1989 | Von Heck | 340/427 |
| 4,854,144 | A | * 8/1989 | Davis | 70/226 |
| 5,134,868 | A | * 8/1992 | Bethards | 70/18 |
| 5,247,815 | A | * 9/1993 | Caldwell | 70/19 |
| 5,315,848 | A | * 5/1994 | Beyer | 70/18 |
| 5,724,839 | A | * 3/1998 | Thering | 70/18 |
| 5,802,887 | A | * 9/1998 | Béland | 70/14 |
| 5,829,285 | A | * 11/1998 | Wilson | 70/226 |
| 5,862,688 | A | * 1/1999 | Ødegård | 70/19 |
| 5,873,275 | A | * 2/1999 | Lukich | 70/226 |
| 5,887,462 | A | * 3/1999 | Stone | 70/19 |
| 6,112,560 | A | * 9/2000 | Mabee | 70/14 |

FOREIGN PATENT DOCUMENTS

| | | | | |
|---|---|---|---|---|
| GB | 2106058 | A * | 4/1983 | 70/226 |
| WO | WO 86/05150 | | * 12/1986 | 70/226 |

* cited by examiner

Primary Examiner—Katherine A. Matecki
Assistant Examiner—Carlos Lugo
(74) Attorney, Agent, or Firm—Goldstein Law Offices, P.C.

(57) ABSTRACT

A tire clamp for immobilizing a vehicle including a fixed bar having a generally L-shaped configuration. The fixed bar is comprised of a horizontal segment and a vertical segment. The horizontal segment is comprised of an inner portion and an outer portion. The inner portion has a plurality of sharpened teeth extending downwardly therefrom. The vertical segment has an inwardly angled lower portion. The fixed bar is positionable with respect to a tire with the horizontal segment disposed above and extending across the tire with the plurality of teeth abutting the tire and pointed thereat. A movable bar has an inwardly angled lower portion and is coupled with the fixed bar and is slidably mounted thereon. The movable bar is positionable with respect to a tire with both inwardly angled lower portions positioned against an exterior of the rim the tire is mounted on while the sharpened teeth remain oriented toward and abutting the tire. A lock prevents removal of the movable bar and movement with respect to the fixed bar.

5 Claims, 2 Drawing Sheets

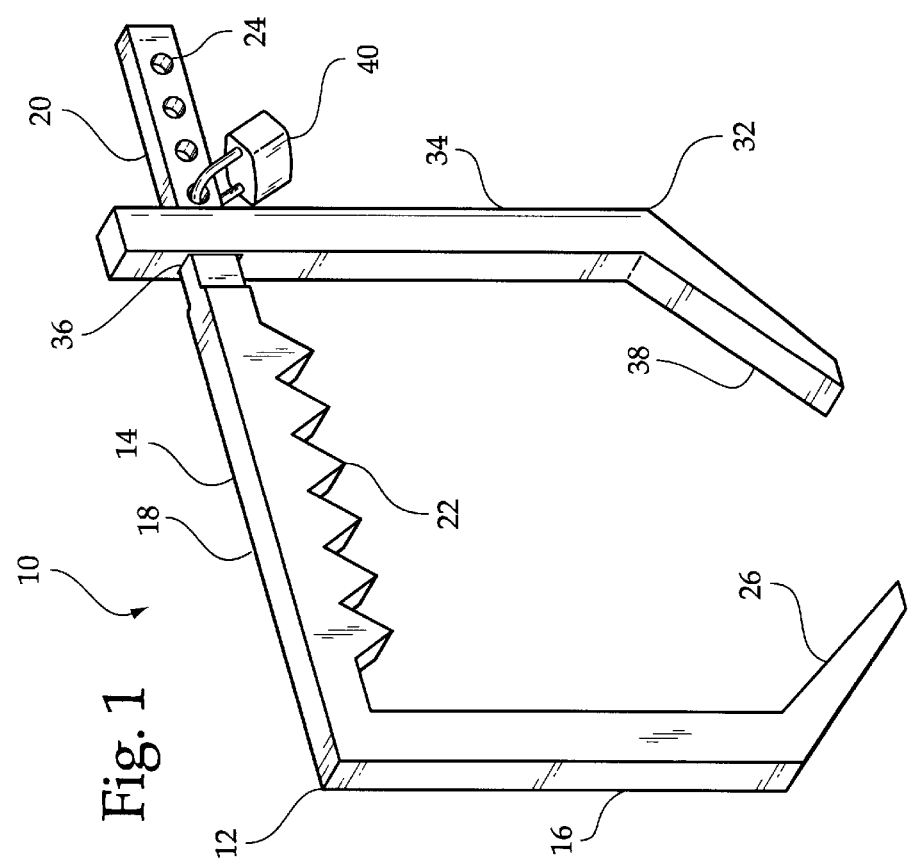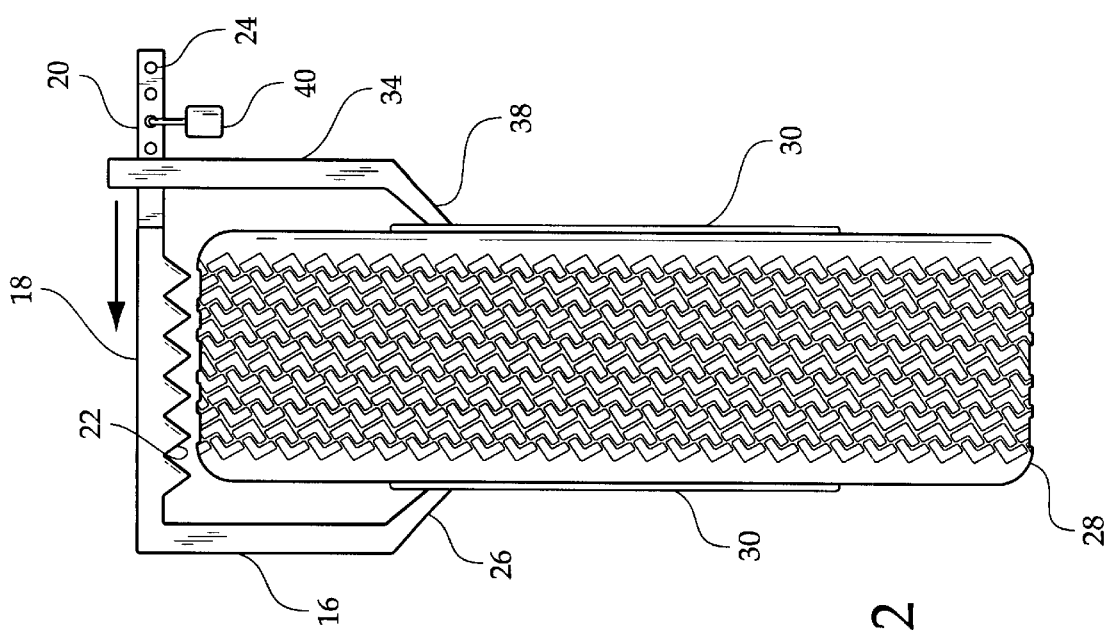
Fig. 1
Fig. 2

TIRE CLAMP FOR IMMOBILIZING A VEHICLE

CROSS REFERENCES AND RELATED SUBJECT MATTER

This invention relates to subject matter contained in utility patent application Ser. No. 09/616,663, filed in the United States Patent Office on Jul. 14, 2000.

BACKGROUND OF THE INVENTION

The present invention relates to a tire clamp for immobilizing a vehicle and more particularly pertains to preventing a vehicle from being driven by precluding the rotation of a single tire thereof.

The use of devices for immobilizing vehicles is known in the prior art. More specifically, devices for immobilizing vehicles heretofore devised and utilized for the purpose of immobilizing vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,854,144 to Davis discloses a "boot" type immobilizing device comprised of an adjustable, lockable arm with a spike capable of puncturing the tire in the event that an unauthorized person attempts to drive the vehicle. U.S. Pat. No. 5,247,815 to Caldwell discloses a tire lockable clamp comprised of a set of jaws with teeth incorporated capable of puncturing the sidewalls of the tire to prevent the theft of a vehicle. U.S. Pat. No. 5,134,868 to Bethards discloses a device comprised of a pair of jaws attachable to a tire to immobilize a vehicle.

While these devices fulfill their respective, particular objective and requirements, the aforementioned patents do not describe a tire clamp for immobilizing a vehicle for preventing a vehicle from being driven by precluding the rotation of a single tire thereof.

In this respect, the tire clamp for immobilizing a vehicle according to the present invention substantially departs from the conventional concepts and designs of the prior art, and in doing so provides an apparatus primarily developed for the purpose of preventing a vehicle from being driven by precluding the rotation of a single tire thereof.

Therefore, it can be appreciated that there exists a continuing need for a new and improved tire clamp for immobilizing a vehicle which can be used for preventing a vehicle from being driven by precluding the rotation of a single tire thereof. In this regard, the present invention substantially fulfills this need.

SUMMARY OF THE INVENTION

In the view of the foregoing disadvantages inherent in the known types of devices for immobilizing vehicles now present in the prior art, the present invention provides an improved tire clamp for immobilizing a vehicle. As such, the general purpose of the present invention, which will be described subsequently in greater detail, is to provide a new and improved tire clamp for immobilizing a vehicle which has all the advantages of the prior art and none of the disadvantages.

To attain this, the present invention essentially comprises a fixed bar having a generally L-shaped configuration. The fixed bar is comprised of a horizontal segment and a vertical segment. The horizontal segment is comprised of an inner portion and an outer portion. The inner portion has a plurality of teeth extending downwardly therefrom. The outer portion is tapered and has a plurality of linearly. aligned apertures therethrough in a spaced relationship. The vertical segment extends downwardly from the inner portion of the horizontal segment in an orthogonal relationship. The vertical segment has an inwardly angled lower portion. The fixed bar is positionable with respect to a tire with the horizontal segment disposed above the tire with the plurality of teeth abutting the tire and with the inwardly angled lower portion positioned against an interior of the rim the tire is mounted on. A movable bar removably couples with the fixed bar for engaging the tire. The movable bar is comprised of an elongated vertical component. The vertical component has an aperture therethrough for receiving the outer portion of the horizontal segment of the fixed bar therein. The vertical component has an inwardly angled lower portion. The movable bar is positionable with respect to a tire with the inwardly angled lower portion positioned against an exterior of the rim the tire is mounted on. A lock is positionable through one of the plurality of apertures of the outer portion of the horizontal segment of the fixed bar after the movable bar has been positioned on the outer portion to prevent removal of the movable bar from the fixed bar.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tire clamp for immobilizing a vehicle which has all the advantages of the prior art devices for immobilizing vehicles and none of the disadvantages.

It is another object of the present invention to provide a new and improved tire clamp for immobilizing a vehicle which may be easily and efficiently manufactured and marketed.

It is a further object of the present invention to provide a new and improved tire clamp for immobilizing a vehicle which is of durable and reliable construction.

An even further object of the present invention is to provide a new and improved tire clamp for immobilizing a vehicle which is susceptible of a low cost of manufacture with regard to both materials and labor, and which accordingly is then susceptible of low prices of sale to the consuming public, thereby making such a tire clamp for immobilizing a vehicle economically available to the buying public.

Even still another object of the present invention is to provide a new and improved tire clamp for immobilizing a vehicle for preventing a vehicle from being driven by precluding the rotation of a single tire thereof.

Lastly, it is an object of the present invention to provide a new and improved tire clamp for immobilizing a vehicle including a fixed bar having a generally L-shaped configuration. The fixed bar is comprised of a horizontal segment and a vertical segment. The horizontal segment is comprised of an inner portion and an outer portion. The inner portion has a plurality of teeth extending downwardly therefrom. The vertical segment has an inwardly angled lower portion. The fixed bar is positionable with respect to a tire with the horizontal segment disposed above the tire with the plurality of teeth abutting the tire and with the inwardly angled lower portion positioned against. an interior of the rim the tire is mounted on. A movable bar removably couples with the fixed bar for engaging the tire. The movable bar is comprised of an elongated vertical component. The vertical component has an aperture therethrough for receiving the outer portion of the horizontal segment of the fixed bar therein. The vertical component has an inwardly angled lower portion. The movable bar is positionable with respect to a tire with the inwardly angled lower portion positioned against an exterior of the rim the tire is mounted on. A lock prevents removal of the movable bar from the fixed bar.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes referenced to the annexed drawings wherein:

FIG. 1 is a perspective view of the preferred embodiment of the tire clamp for immobilizing a vehicle constructed in accordance with the principles of the present invention.

FIG. 2 is a front view of the present invention illustrated in use.

The same reference numerals refer to the same parts through the various figures.

DESCRIPTION OF THE PREFERRED EMBODIMENT

Figure 3:
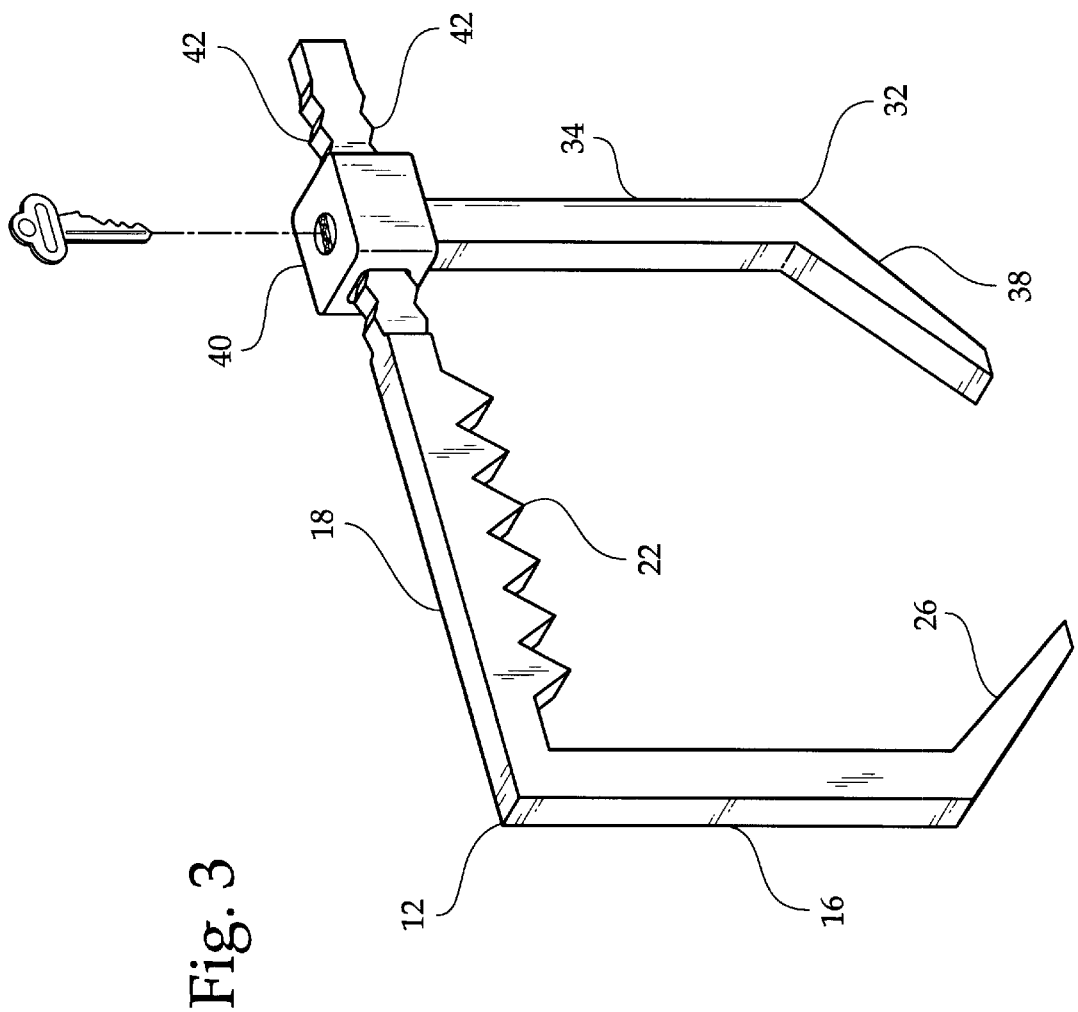
FIG. 3 is a perspective view of an alternate embodiment of the present invention.

With reference now to the drawings, and in particular, to FIGS. 1 through 3 thereof, the preferred embodiment of the new and improved tire clamp for immobilizing a vehicle embodying the principles and concepts of the present invention and generally designated by the reference number 10 will be described.

Specifically, it will be noted in the various figures that the device relates to a tire clamp for immobilizing a vehicle for preventing a vehicle from being driven by precluding the rotation of a single tire thereof. In its broadest context, the device consists of a fixed bar, a movable bar, and a lock. Such components are individually configured and correlated with respect to each other so as to attain the desired objective.

The fixed bar 12 has a generally L-shaped configuration. The fixed bar 12 is comprised of a horizontal segment 14 and a vertical segment 16. The horizontal segment 14 is comprised of an inner portion 18 and an outer portion 20. The inner portion 18 has a plurality of sharpened teeth 22 extending downwardly therefrom. The outer portion 20 is tapered and has a plurality of linearly aligned apertures 24 therethrough in a spaced relationship. The vertical segment 16 extends downwardly from the inner portion 18 of the horizontal segment 14 in an orthogonal relationship. The sharpened teeth 24 point in a parallel direction to the vertical segment 16. The vertical segment 16 has an inwardly angled lower portion 26. The fixed bar 12 is positionable with respect to a tire 28 with the horizontal segment 14 disposed above the tire 28 with the plurality of teeth 22 abutting the tire 28 and with the inwardly angled lower portion 26 positioned against an interior of the rim 30 the tire 28 is mounted on.

The movable bar 32 removably couples with the fixed bar 12 for also engaging the tire 28. The movable bar 32 is comprised of an elongated vertical component 34. The vertical component 34 has an aperture 36 therethrough for receiving the outer portion 20 of the horizontal segment 14 of the fixed bar 12 therein. The vertical component 34 has an inwardly angled lower portion 38. The movable bar 32 is positionable with respect to a tire 28 with the inwardly angled lower portion 38 positioned against an exterior of the rim 30 the tire 28 is mounted on, such that the inwardly angled lower portions 28 and 30 together "pinch" the rim 30 while the sharpened teeth 22 abut;the tire 28.

The lock 40 is positionable through one of the plurality of apertures 24 of the outer portion 20 of the horizontal segment 14 of the fixed bar 12 after the movable bar 32 has been positioned on the outer portion 20 to prevent removal of the movable bar 32 from the fixed bar 12, and to prevent movement of the fixed bar 12 with respect to the movable bar, so that as long as the lock 40 is engaged, the inwardly angled lower portions 28 and 30 will continue to pinch the rim and keep the sharpened teeth positioned against the tire 28. The lock 40 used in the preferred embodiment is a standard padlock.

In an alternate embodiment, as illustrated in FIG. 3, the outer portion 20 is provided with ratchet teeth 42 and the lock 40 is a housing-type lock that can engage the teeth 42 to lock the movable bar 32 with respect to the fixed bar 12 so as to engage the tire 28.

In use, the present invention is locked to the tire 28 and rim 30 as illustrated in FIG. 2. Note that the distance between the tire 28 and the sharpened teeth 22 is exaggerated in FIG. 2 for clarity. Thus, with the inwardly angled lower portions 26 and 38 pinching the rim, the present invention will preclude the rotation of the tire 28. Therefore, before the tire 28 completes a single revolution, the sharpened teeth 22 which abut the tire and are pointed thereat will be forced into the tire 28, puncturing the tire and disabling the vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired. to be protected by Letters Patent of the United States is as follows:

1. A tire clamp for immobilizing a vehicle for preventing a vehicle from being driven by precluding the rotation of a single tire thereof, wherein the tire is mounted on a rim, the tire clamp comprising, in combination:

a fixed bar having a generally L-shaped configuration, the fixed bar being comprised of a horizontal segment and a vertical segment which extends substantially orthogonal to the horizontal segment, the horizontal segment being comprised of an inner portion and an outer portion, the inner portion having a plurality of sharpened teeth extending downwardly therefrom, the sharpened teeth pointing in a direction parallel to the vertical segment, the vertical segment having an inwardly angled lower portion, the fixed bar being positionable with respect to a tire with the horizontal segment disposed above the tire with the plurality of sharpened teeth abutting the tire and pointed thereat with the inwardly angled lower portion positioned against an interior of the rim the tire is mounted on the outer portion having a plurality of apertures;

a movable bar removably coupling with the fixed bar for engaging the tire, the movable bar being comprised of an elongated vertical component, the vertical component having an aperture therethrough for receiving the outer portion of the horizontal segment of the fixed bar therein, the vertical component having an inwardly angled lower portion, the movable bar being positionable with respect to a tire such that said inwardly angled lower portion the movable bar and the inwardly angled lower portion of the fixed bar are positioned against an exterior of the rim the tire is mounted on and pinch the rim therebetween; and a lock positionable through one of the plurality of apertures of the outer portion of the horizontal segment of the fixed bar after the movable bar has been positioned to lock the position of the movable bar upon the fixed bar.

2. A tire clamp for immobilizing a vehicle for preventing a vehicle from being driven by precluding the rotation of a single tire thereof, wherein the tire is mounted on a rim, the tire clamp comprising, in combination:

a fixed bar having a generally L-shaped configuration, the fixed bar being comprised of a horizontal segment and a vertical segment, the vertical segment extending substantially orthogonal to the horizontal segment, the horizontal segment being comprised of an inner portion and an outer portion, the inner portion having a plurality of sharpened teeth extending downwardly therefrom, the sharpened teeth pointed in a direction substantially parallel to the vertical segment, the vertical segment having an inwardly angled lower portion, the fixed bar being positionable with respect to a tire with the horizontal segment disposed above the tire with the plurality of teeth abutting the tire and oriented toward the tire and with the inwardly angled lower portion positioned against an interior of the rim the tire is mounted on;

a movable bar removably coupling with the fixed bar for engaging the tire, the movable bar being comprised of an elongated vertical component, the vertical component thereof having an aperture therethrough for receiving the outer portion of the horizontal segment of the fixed bar therein, the vertical component having an inwardly angled lower portion, the movable bar being positionable with respect to a tire with the inwardly angled lower portion positioned against an exterior of the rim the tire is mounted on, such that the inwardly angled lower portions of the movable bar and fixed bar pinch the rim therebetween; and a lock preventing movement of the movable bar with respect to the fixed bar.

3. The tire clamp for immobilizing a vehicle as set forth in claim 2, wherein the outer portion of the horizontal segment of the fixed bar is tapered and has a plurality of linearly aligned apertures therethrough in a spaced relationship for receiving the lock to prevent removal of the movable bar from the fixed bar.

4. The tire clamp for immobilizing a vehicle as set forth in claim 2, wherein the vertical segment of the fixed bar extends downwardly from the inner portion of the horizontal segment in an orthogonal relationship.

5. The tire clamp for immobilizing a vehicle as set forth in claim 2, wherein the outer portion of the horizontal segment of the fixed bar has ratchet teeth disposed thereon for engaging the lock positioned atop the movable bar.

* * * * *